United States Patent
Yeh et al.

(10) Patent No.: US 6,208,717 B1
(45) Date of Patent: Mar. 27, 2001

(54) METHOD FOR MIGRATING OR ALTERING A MESSAGING SYSTEM

(75) Inventors: Yen-Ching Yeh, Broomall; Lucy Winter, Elkins Park; Murali Subramanian, West Chester, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/027,975

(22) Filed: Feb. 23, 1998

Related U.S. Application Data

(60) Provisional application No. 60/039,284, filed on Mar. 3, 1997.

(51) Int. Cl.[7] .................................................. H04M 1/64
(52) U.S. Cl. .................................... 379/88.18; 379/201
(58) Field of Search ........................... 379/88.18, 88.22, 379/88.27, 201, 207

(56) References Cited

U.S. PATENT DOCUMENTS

| | | | |
|---|---|---|---|
| 4,754,479 | 6/1988 | Bicknell et al. ...................... 379/207 |
| 4,790,003 | 12/1988 | Kepley et al. ........................ 379/142 |
| 4,811,334 | 3/1989 | Matt ...................................... 370/60 |
| 4,933,967 | 6/1990 | Lo et al. ................................ 379/94 |
| 5,029,199 | 7/1991 | Jones et al. ............................ 379/89 |
| 5,036,535 | 7/1991 | Gechter et al. ....................... 379/210 |
| 5,113,430 | 5/1992 | Richardson, Jr. et al. ............. 379/94 |
| 5,175,761 | 12/1992 | Khalid et al. .......................... 379/89 |
| 5,231,649 | 7/1993 | Duncanson ........................... 370/536 |
| 5,260,990 | 11/1993 | MeLampy et al. .................... 379/67 |
| 5,274,696 | 12/1993 | Perelman .............................. 379/89 |
| 5,278,897 | 1/1994 | Mowery et al. ...................... 379/212 |
| 5,293,376 | 3/1994 | White .................................... 370/54 |
| 5,299,259 | 3/1994 | Otto ...................................... 379/221 |
| 5,375,167 | 12/1994 | Bales et al. ........................... 379/207 |
| 5,377,262 | 12/1994 | Bales et al. ........................... 379/220 |
| 5,381,462 | 1/1995 | Larson et al. ......................... 379/106 |
| 5,388,151 | 2/1995 | Khalid et al. .......................... 379/67 |
| 5,461,665 | * 10/1995 | Shur et al. ............................ 379/67.1 |
| 5,504,801 | * 4/1996 | Moser et al. ............................ 375/29 |
| 5,651,059 | * 7/1997 | Morgan et al. ....................... 379/207 |
| 5,909,483 | * 6/1999 | Weare et al. ......................... 379/88.18 |
| 5,915,004 | * 6/1999 | Pabbati et al. ................ 379/88.18 X |
| 5,960,205 | * 9/1999 | Mao et al. ............................ 395/712 |
| 6,006,034 | * 12/1999 | Heath et al. .......................... 395/712 |
| 6,009,274 | * 12/1999 | Fletcher et al. ...................... 395/712 |

* cited by examiner

*Primary Examiner*—Scott L. Weaver
(74) *Attorney, Agent, or Firm*—Lise A. Rode; Mark T. Starr; Woodcock Washburn Kurtz Mackiewicz & Norris LLP

(57) ABSTRACT

A method for changing or migrating a voice messaging system comprises the steps of creating a new version of a mailbox for at least one user; and using the new version for a period of time before removing an old version of the mailbox. Significantly, the change or migration is effected such that there is substantially no system interruption. The changes may include making a software upgrade; moving a logical or physical device from a first location to a second location or from a first computer system to a second computer system; and making a change from a first version of the application to a second version. The migration may be a complete migration in which all devices are migrated or a partial migration in which only selected devices are migrated. Once the change or migration begins, any new inputs or calls to a device are routed first to the new application and, if the new application is not yet ready to receive the input, then to the old application. Alternatively, the sequence may be reversed and the new input calls may be noted first to the old application and then to the new application.

21 Claims, 3 Drawing Sheets

METHOD FOR MIGRATING OR ALTERING A MESSAGING SYSTEM

This application is a provisional application of 60/039,284 filed Mar. 3, 1997.

BACKGROUND OF THE INVENTION

1. Field of the Invention

The present invention relates generally to methods and apparatus for changing a user service and the associated data flow in a computer system, and a computer program product therefor. More particularly, the present invention relates to a method and apparatus for altering or migrating a messaging system from a first version, location, or system to a second version, location, or system.

2. Background Art

Due in part to the dynamics of modern business environments, messaging services, including voice messaging services (VMS), have evolved from a simple notation on a piece of paper to sophisticated, computer-controlled messaging and information management systems.

Often a first person places a telephone call to a second person, and the second person is not at the point of call, for example, because of a meeting, and a simple VMS system stores a brief message representing that telephone call. Later, the second person can review the message from the first person and take the appropriate action based on that communication. Even though the persons involved did not have a real-time conversation, the VMS provided a method by which they could conveniently transfer information.

A voice messaging system can be a small, self-contained, microprocessor-controlled device having few features but suitable for use in an individual residence. To the other extreme, a VMS can be a full-featured voice messaging application that services hundreds of thousands of users, or more, simultaneously, running on centralized mainframe computers or distributed enterprise servers. Such a large application could be employed in telephone companies, service bureaus, colleges, and other large institutions.

A VMS preserves the benefits of interactive communications, eliminating the time wasted trying to speak with others directly. It has been reported that 80% of all calls are not answered by the recipient, and about 55% of calls require only one-way communication.

Another benefit of a VMS is that it enables callers in other time zones to leave key messages after normal business hours, permitting business to continue despite the users being on opposite sides of the globe.

The business advantages of having a VMS is put into perspective by the fact that, within the first 15 years of commercial VMS deployment, up to ninety percent of Fortune 500 companies used some form of voice messaging system. Currently, voice messaging systems are evolving into multimedia messaging systems, integrating voice, fax, data, and video messages into one system.

At the most abstract level, a VMS may be viewed as an interface between a message provider and one or more message recipients. Typically, a VMS system itself has interfaces to the message recipients or subscribers and the separate administrative interface. Furthermore, subscriber interfaces can be employed for mailbox access, mailbox greetings, message review, voice messaging, profiling, etc.

A voice messaging system can be implemented on one or more computers such that the subscribers receive timely messaging services even during periods of heavy use. Often, a voice messaging system may also include a network interface to the message provider, or the network interface can be part of a separate network application. In general, many VMS interfaces have been standardized across the industry to provide provisioning, billing, callflow and a variety of administrative reports.

Because of their ubiquity and the critical placement of voice messaging services in the heart of a business' information system, a shutdown or prolonged failure of the messaging system can have disastrous effects on the business. For example, when software upgrades are made, there usually is a great deal of down-time and the voice mail subscribers cannot access their mailboxes. In some circumstances, removing a computer system from service for a software upgrade is a necessity that actually may invite a larger problem. Under certain circumstances, the computer system cannot be put back into service for reasons other than the VMS upgrade. Quite often, these situations can leave a business without telephone communications for days.

In the prior art, an exemplary general migration process took eight steps. This process required the system to be taken off line and shut down, causing a long down-time for users. Although some steps can be accomplished prior to the actual migration, the actual migration itself can create extensive service loss due to down-time. These eight steps can include:

(1) Regenerating a new system file for all mailboxes having appropriate new data added or old data removed;

(2) Verifying the data of each mailbox;

(3) Dumping and storing selected system variables and mailbox data;

(4) Initializing new data sets for the new mailboxes and the system;

(5) Generating the new UVMS application and loading it onto the host;

(6) Loading into the new application the data sets stored at Step 3, above, and initializing the administrative and management functions;

(7) Migrating the old device, or mailbox, from the old application to the new device on the new application; and (8) Re-initializing networking data, and bringing the network computer system and voice application back into service.

Even if Steps 1 through 7 are executed successfully, Step 8 can introduce an unexpected system failure because the stress of the system shutdown created an unstable state or induced component failure.

What is needed then is a method for upgrading the software of a voice messaging system that is substantially transparent to the user, in that an individual subscriber would be limited in the use of his or her mailbox for a brief, but acceptable period. U.S. patent application Ser. No. 08/694,517, filed Aug. 9, 1996, "System for Incremental Redistribution of Telephony Applications Computing Workload," may be consulted for further background information relating to the present invention, and for its disclosure of a related invention. Briefly, this patent discloses a system for distributing the work load of a telephony messaging service by transferring voice messages and data in small increments from the originating host to the destination host. The small increments do not cause out-of-service conditions for the users not being migrated, and the efficient transfer mechanism reduces the time during which the small increment of user services being transferred is out of service. In this way, the system permits the transfer of selected user voice mailboxes from one host to another while minimizing out-of-service conditions. Moreover, the system administrator is able to specify a dynamically scaleable number of concurrent dialogs that are to be used in transferring the voice messages, and so he or she can control the transfer while it is in progress to enhance efficiency by increasing or decreasing the number of dialogs utilized in the transfer.

SUMMARY OF THE INVENTION

The present invention provides a method and system for changing or migrating a voice messaging system. The inventive method comprises the steps of creating a new version of a mailbox for at least one user; and using the new version for a period of time before removing an old version of the mailbox. Significantly, the change or migration is effected such that there is substantially no system interruption.

According to the invention, the changes may include making a software upgrade; moving a logical or physical device from a first location to a second location or from a first computer system to a second computer system; and making a change from a first version of the application to a second version. Moreover, the migration may be a complete migration in which all devices are migrated or a partial migration in which only selected devices are migrated. Once the change or migration begins, any new inputs or calls to a device are routed first to the new application and, if the new application is not yet ready to receive the input, then to the old application. Alternatively, the new inputs or calls could be routed first to the old application, and then to the new application if the old application is not ready. Either sequence will work, provided that both the old and new applications are installed simulaneously for a period of time.

In a presently preferred embodiment of the invention, the migration comprises three phases, including a pre-migration phase, an on-line migration phase, and a post-migration phase. The pre-migration phase may comprise: (1) system flat-file updating; (2) data verification; (3) dumping selected system and file variables; (4) loading the new application; and (5) loading selected data sets. The on-line migration phase may comprise: (1) selecting the scope of migration; (2) disabling callflows and polling; (3) initiating a multiple migration session; (4) transferring selected devices or mailboxes from the first application to the second application; (5) updating existing files; and (6) finding and evaluating errors. In the post-migration phase, the old application is deleted.

Other features and advantages of the present invention are disclosed below.

DETAILED DESCRIPTION OF PREFERRED EMBODIMENTS

Figure 1:
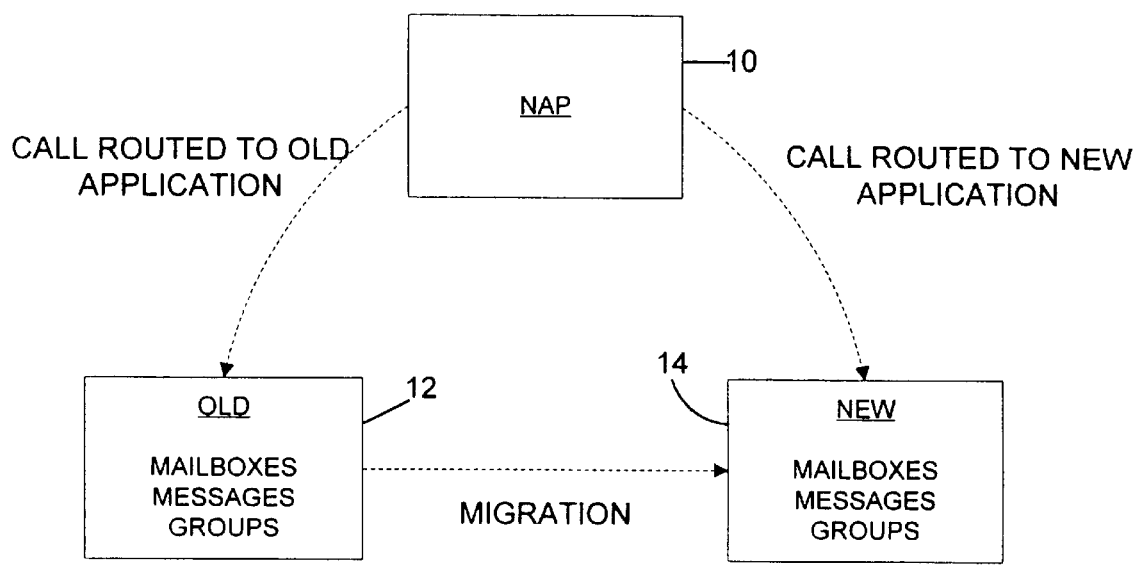
FIG. 1 is a flow diagram of incoming messages between the first and second applications and the Network Applications Platform.

The invention disclosed herein provides a method, system and computer product for upgrading messaging service software in a manner that is substantially transparent to the subscribers. According to preferred embodiments of the invention, such on-the-fly software upgrades permit an enterprise to upgrade its voice messaging services without sustaining a perceptible loss of communication services.

Thus, such an upgrade can be effected during normal business hours. The benefits to a business can be very real. First, its voice messaging software can be upgraded without interrupting the communication flow, and by extension, revenue flow, of the enterprise. Second, software upgrades do not need to be orchestrated in businesses having extended or round-the-clock operations. Third, the likelihood that the computer system infrastructure will fail to resume normal operations because of a software upgrade shutdown is significantly reduced.

One such VMS is the A-Series Universal Voice Messaging System (UVMS) which operates in conjunction with the A-Series Network Applications Platform (NAP). A-Series computer systems, the Network Applications Platform, and the Universal Voice Messaging System are products currently available from Unisys Corporation, Blue Bell, Pa.

Two United States patents which describe in detail a NAP system using voice message management include U.S. Pat. No. 5,133,004, "Digital Computer Platform For Supporting Telephone Network Applications" (Heileman, et al.); and U.S. Pat. No. 5,138,701, "Apparatus And Method For Providing Recoverability In Mass Storage Data Base Systems Without Audit Trail Mechanisms" (Kruesi, et al.). Both of these U.S. patents are assigned to the assignee hereof (Unisys Corp.), and are completely incorporated herein by reference.

Commercially-available documents, available from Unisys Corporation, which describe the architecture and operations of the NAP and UVMS include:

| Unisys Part Name | Unisys Part No. |
| --- | --- |
| A-Series Network Applications Platform (NAP) Technical Overview Manual | 4178-1253 |
| A-Series Network Applications Platform (NAP) Planning and Implementation Guide | 4178-1253 |
| A-Series Universal Voice Messaging System (UVMS) Administration and Operations Guide | 4178-1543 |
| A-Series Universal Voice Messaging System (UVMS) Planning and Implementation Guide | 4178-1667 |
| A-Series Universal Voice Message System (UVMS) Users Guide | 4178-543 |

Each of these documents is incorporated herein by reference in its entirety.

For simplicity of presentation, the aforementioned Unisys products (A-Series Computer, NAP architecture, and UVMS software) will be discussed, although one of ordinary skill in the art would recognize that the invention is not limited to such computer systems, network architectures, or specific voice messaging services.

In general, the present invention permits on-the-fly alteration of a physical or logical device that is one of a plurality of such devices without substantially affecting other such devices by making transition to or substantially impairing the access of the client or subscriber to the device undergoing transition.

In the past, system migrations, such as software upgrades for messaging systems, required system shutdown. With the present invention, such migrations can proceed with the messaging system on-line because the second application is created at the beginning of the overall process and remains operating along with the first application until the migration has completed.

In one embodiment of the present invention, a software upgrade on a voice messaging system can be implemented and subscriber mailboxes updated for compatibility in a manner substantially transparent to the particular subscriber. In a second embodiment of the invention, the logical or physical device, which is one of a plurality of such devices, can be moved from a first location to a second location in a manner that is substantially transparent to the device clients or subscribers. In a third embodiment, a physical or logical device, which again is one of a plurality of such devices, can be moved from a first computer system without substantially affecting the other device(s) and in a manner generally transparent to the user.

In the first embodiment, the migration from the first version of software to a second version is preferred to occur on a single computer system. The migration can be effected such that there is virtually no system interruption, and despite the possibility that a new data structure, including new data fields, may be required for a second software application.

In general, the migration includes the steps of creating a new application on a host computer, moving a first device to the application, updating the device in a manner consistent with the upgrade and regenerating the device, for example, by writing the mailbox data structure back to a disk in its original physical location. Although it is preferred that the device user or subscriber is locked-out or prevented from using the device during the migration, limited functionality may be preserved. It is also preferred that one device will be migrated at a time, thereby limiting the global impact of individual migrations.

Under certain circumstances, it is preferred to partition the total user population into groups of pre-selected sizes and to migrate one user within each of the partitions, thereby reducing the total time required for system migration. The migration can be a complete migration or a partial migration. In a complete migration, all devices are migrated or upgraded. In a partial migration, only selected devices are migrated. It is further preferred that, once migration begins, all new inputs or calls to the migrating device be routed first to the new application and, if the new application is not yet ready to receive the input, the information can be transferred to the old application or device. As mentioned above, the sequence may be reversed such that the new inputs or calls are routed first to the old application and then to the new one. (Compare FIGS. 2A and 2B).

In some embodiments of the present invention, it is preferred that the messaging system detects whether a mailbox is unmigrated, in the process of being migrated, or has completed migration. In this circumstance, if the mailbox is being migrated, a voice messaging system will not accept any new input such as messages or any other activity for that mailbox. If it is not yet migrated, the information can be transferred to the old application (or new one). This strategy permits the user to access his/her device or mailbox and messages for most of the particular user's migrations.

Although the transition can be performed during peak system use, it is further preferred that the migration be deferred until off-peak hours merely to reduce the stress on the system and to preserve the existing reserve capacity for users during prime business hours. This method also permits complex changes to be made to a mailbox, including substantial revisions in number, size and characterization of device fields while allowing the user to access the mailbox except for a pre-defined critical period surrounding the actual transition.

Where querying methods such as polling are used to determine the availability of a device, it is further preferred that polling be suspended until the mailbox has been migrated. Polling-related features such as future message delivery and message forwarding will not resume until the migration program is complete.

In yet another preferred embodiment of the present invention, at least a portion of the message is duplicated so that that portion is available to the subscriber even if one of the copies cannot be accessed, thereby making the old and new applications independent. In addition, migration can be done piece-wise in partial increments with the individual increments capable of being adjusted to match current system demand.

In another preferred embodiment of the present invention, the overall migration process may be characterized in three phases: pre-migration, migration, and post-migration. Each such phase is discussed below in turn. First, however, the invention will be described, or summarized, with reference to FIGS. 1, 2A and 2B.

Referring now to FIG. 1, the present invention is preferably employed in connection with a voice messaging system running on a network applications platform, or NAP, 10. The system comprises an "old" application 12 that is to be changed or migrated into a "new" application 14. Both the old and new applications comprise mailboxes, messages and groups, which are typical components of a voice messaging system.

Figure 2A:
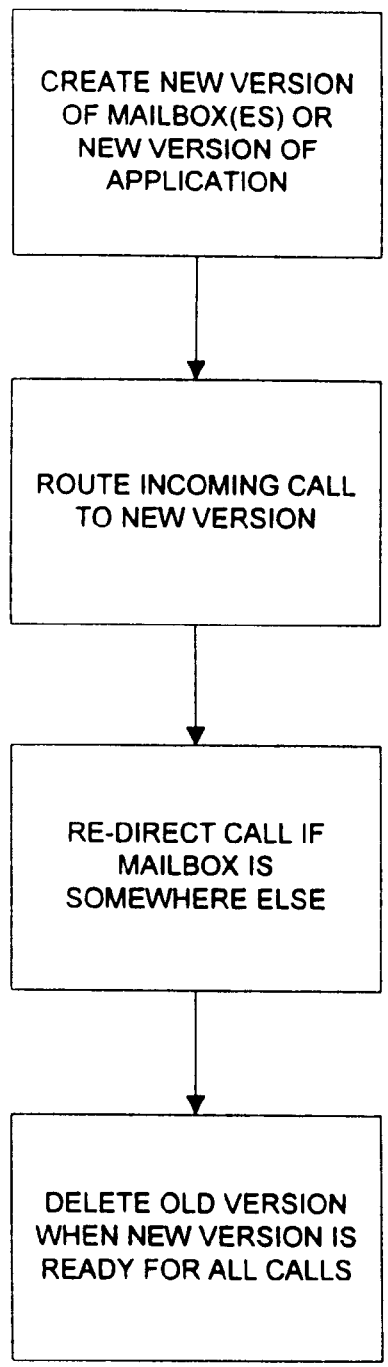
FIGS. 2A and 2B are flowcharts of presently preferred embodiments of the invention.
Figure 2B:
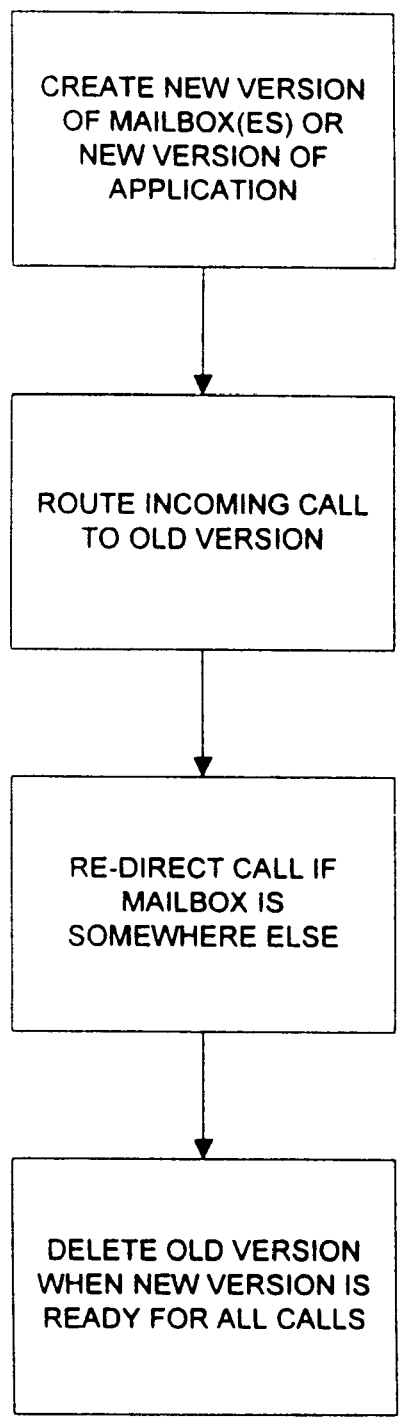

As shown in FIGS. 2A and 2B, a new version of one or more mailboxes or of the application 12 itself is created, and then incoming calls are routed to the new application/mailbox 14 before the "old" application 12 is deleted, or vice versa. However, if the new version of the application is not yet ready to receive an incoming call, the call is re-directed to the old application 12 or vice versa. The old application 12 is not deleted until the new version 14 is up and running. In this way, the voice messaging system remains on-line and available to all or most users while the change/migration is taking place.

Phase A. The Pre-Miaration Phase

In one exemplary embodiment of the present invention, the pre-migration phase itself can have five steps: system flat-file updating; data verification; dumping selected system and file variables; loading the new application; and loading selected data sets.

1. System Flat-File Updating

In the examplary embodiment, it is preferred that no domains be added, deleted, or modified during this period. All mailboxes in a domain should be the same length and have the same country code. An existing customer may want to predefine additional fields and such capability can be provided. A new report can be created that requests general defaults for mailbox lengths, country codes, etc., and partition, domain, and system information. This report contains an entry for each domain in the existing application. The report updates the relevant system flat-file.

2. Data Verification

A new report can read the flat file created in step A.1, which reads all mailboxes in each domain and verifies their length. If the mailbox is not the length specified for that domain, the mailbox can be printed. Prior to migration, the mailboxes with different lengths should be moved to a domain with the correct length. All mailboxes within a domain are expected to contain the same country code. If the mailboxes do not belong within a particular domain, they can be moved. If networking is to be used, the Addressing Services are preferred to be loaded. This load typically will not take place until after the migration.

3. Dumping of Selected System File Variables

At this point of the migration, provisioning of mailboxes should stop, and future changes to mailboxes should not be made until that particular mailbox has been migrated. It is preferred that one portion will contain only key elements fields in this flat file. The dynamic portion can be updated during the actual migration. Only main mailboxes are preferred to be dumped. Guest or family mailboxes can be moved during the actual migration process, because these can be changed via callflows.

4. Loading the New Application

The new application is preferred to be first configured in the Network Applications Platform, e.g., NAP. An installation manager program can be executed to install the new application from the release tape. A customer parameter file can be made available and filled in by the customer.

5. Loading Selected Data Sets

Selected data sets, from the file created in step A.1, are preferred to be reloaded at this point. The customer can interactively manage the progress of the application at this point by providing the system with information including the former database release number, the NAP data base number, and the like. The system can load the mailboxes, first examining the contents for expected values (e.g., country codes). Some of the new fields can be pre-filled with preferred initial values. It is preferred that a preselected record have a flag set therein indicating whether the mailbox is available to the new application.

Phase B. The On-Line Micfration Phase

In the on-line migration phase, the user can determine what will be transferred with this particular migration. This phase can consist of six steps: selecting the scope of migration; disabling callflows and polling; initiating a multiple migration session (if desired); transferring the selected devices or mailboxes from the first application to the second application; updating existing files; and finding and evaluating errors. In the most preferred embodiment of the present invention, the migration program is restartable, and be stopped and restarted at a later time. Likewise, the overall migration plan can be done piecewise so that the use of system resources during peak hours can be minimized, and the migration can be tailored to the needs of the user.

1. Selecting The Scope Of Migration

Because migration according to the present invention is not limited to an all-or-nothing procedure, as with previous migration methods, the scope of migration can be selectable by the user. The devices selected for migration can include the whole application, a domain, or even a range of mailboxes.

2. Disabling Callflows And Polling

When multiple mailboxes are to be moved in multiple migration sessions, it is preferred to disable callflows because of the potential loss of messages. One such instance being the delivery of a message to a closed mailbox during the brief lock-out period. Although one of ordinary skill in the art could easily track callflows during periods of mailbox lockout, the brief, substantially transparent periods of mailbox unavailability can make such tracking impractical.

Polling in the old application is preferred to be stopped during the migration, thus delaying polling-related functions such as "Future Delivery" and "Message Forwarding" until the completion of migration.

3. Initiating A Multiple Migration Session

If a multiple migration session is desired, it can proceed by establishing multiple individual sessions, each of which are preferred to move one mailbox seriatim within each session, until the scope of the migration is satisfied.

4. Transferring Selected Devices Or Mailboxes From The First Application To The Second Application When the one or more migration sessions commence, it is preferred to indicate to the system that the migration is underway, to inform the system of the destination application, and to initiate mailbox lockouts during the actual migration of an individual mailbox. Migration of the voice data can include merely the reproduction of data pointers for both the old application and new application to reference. Migration also may include the reproduction of the voice data itself with each of the old application and new application referencing identical copies. The two copy model permits each application to be independent, and each copy to be independent. Incoming messages can be automatically re-routed to the mailbox that is currently active, if desired. Also, the message can first be routed to the old mailbox location and, if the mailbox already has migrated, the message can then be transferred to the new mailbox. Again, as defined herein, migration is not limited to moving mailboxes but can also comprehend managing mailboxes during software upgrades, and the like. It can be desirable to employ separate migrations to move the data and the voice from the source application to the destination application.

5. Updating Existing Files

Typically, the one or more flat files having status, event, and other records associated with the mailbox are updated to reflect the appropriate state of the new mailbox in the new application. All voices associated with the mailbox, for example, greetings, recorded names, and so on, are moved to the new mailbox at this time. When all of the files are updated, it is preferred to mark the new mailbox as available, and any attempt to leave a Call Answer message or to access voice mail would not be made to the old mailbox, but may be available to the new mailbox.

6. Finding And Evaluating Errors

Once the migration has reached a point of completion, error files can be analyzed for the nature and extent of migration errors. It is preferred to address these errors to the greatest extent possible to minimize disruption to the subscribers' mailbox.

Phase C. The Post-Migration Phase

In the post-migration phase, the user can resume network operations, clean up tables and files, and delete the old application unless, because of a partial migration, both old and new applications are preferred to be kept operable.

Discussion of APPENDICES A and B

Appendices A and B, attached hereto, provide detailed descriptions of two embodiments of the method according to the present invention. These appendices are indicative of both the method and the computer program product thereof.

While various embodiments and features of the present invention are disclosed above, it should be understood that they have been presented by way of example only, and not limitation. Many modifications and variations of the present invention are possible in light of the above teachings. Thus, the breadth and scope of protection of the following claims should not be limited to the above-described exemplary embodiments.

Appendix A Migration Steps (destination)

The destination application software and SPIN application (voice) must: be installed prior to performing the migration. The NAPTOOL Installation Manager is used to install the new application from the release tape. These steps are described in the Planning and Implementation Guide.

Pre-Migration Procedure:
1. Install the destination application
   Configure the destination application
   Run NAPTOOL installation manager to install the destination application
   Note:
   1. a new database number needs to be set for the destination application.
   2. the destination application user code needs to be different from the source application user code.
2. Make sure the LINC reports MSGANALYZE, MBXCLEANUP, MIGUNLOAD1, MIGUNLOAD2, MIGUNLOAD3, COSOVRLAP, and FIXCOSOVR maintenance programs exist in the source application and have been generated.
3. Make sure the LINC reports EVELGDEL, MIGLD12A, MIGLD12B, and MIGLD12C maintenance programs exist in the destination application and have been generated.
4. Compile the Migration COBOL programs
   Sign on to CANDE with the destination usercode.
   Modify the migration customer parameters file:
      GET WFL/UVMS/MIG/CUSTPARAM
      Update the Customer parameter file with customer-specific information.
      Save the Customer parameter file.
   Compile the migration COBOL programs
      Make sure the COBOL migration programs exist:
         SYMBOL/MIGRATION/SET/SRC
         SYMBOL/MIGRATION/PESET/SRC
         SYMBOL/MIGRATION/SRC/11 if migrating from UVMS 11
         SYMBOL/MIGRATION/SRC/121 if migrating from UVMS 12.1
         SYMBOL/MIGRATION/SRC/122 if migrating from UVMS 12.1 or UVMS 12.2
         SYMBOL/MIGRATION/DEST
         SYMBOL/MIGRATION/DEST/121 if migrating from UVMS 12.1
      START WFL/UVMS/MIGRATION/COMPILE
         After the WFL is completed, the following object files should be created:
         If migrating from UVMS11:
            OBJECT/MIGRATION/SET/11
            OBJECT/MIGRATION/RESET/11
            OBJECT/MIGRATION/SRC/11
            OBJECT/MIGRATION/DEST/11
         If migrating from UVMS 12.1:
            OBJECT/MIGRATION/SET/121
            OBJECT/MIGRATION/RESET/121
            OBJECT/MIGRATION/SRC/121
            OBJECT/MIGRATION/DEST/121
            OBJECT/MIGRATION/SRC/122 (for reverse migration)
            OBJECT/MIGRATION/DEST/R122 (for reverse migration)
            Note: OBJECT/MIGRATION/SRC/122 and OBJECT/MIGRATION/R122 will be copied to the old (UVMS 12.1) application user code/pack for reverse migration from UVMS 12.2 to UVMS 12.1.
         If migrating from UVMS 12.1:
            OBJECT/MIGRATION/SET/122
            OBJECT/MIGRATION/RESET/122
            OBJECT/MIGRATION/SRC/122
            OBJECT/MIGRATION/DEST/122
5. Install the APPUTL application if it is not already installed. Refer to UVMS Planning and Implementation Guide for the instruction to install the APPUTL application.
6. Reassign COS Id to the source application mailboxes if the COS is shared by different type (residential, small business, and large business) of mailboxes.
   Initiate COSOVRLAP report (from the Report Initiation screen of the source application Admin) to find all COSs that are shared by mailboxes with different mailbox type.
   Based on the output file from COSOVRLAP report (MBXTYP/COS/OVERLAP), create new COSs with identical settings for use by different type of mailboxes.
   Sign on the CANDE with the source application user code, modify MBXTYP/COS/OVERLAP to assign the new COS to different mailbox type.
   Initiate FIXCOSOVR report (from the Report Inrtiution screen of the source application) to propagate the now COS Ids to the source application mailboxes based on the COS assignment in MBXTYP/COS/OVERLAP file.
7. Run the AGEDELREP, DELREP, and MSGRECON maintenance programs on the source application database to clean up the database. After the cleanup maintenance program are completed, access the OPER2 administration screen of the source application to turn off the AGEDELREP and MSGRECON maintenance programs so they will not be initiated again until migration is completed.
8. Run the EVELGDEL report from the destination application to clean up the EVELG records (:RUN EVELGDEL from page 2)
9. Run the MSGANALYZE report from the source application to get an estimate of how much additional voice storage will be needed.
10. Ensure that your terminal is ODT capable by entering the following command from the MARC screen for both applications: <LSS mix number> AX ODT <station ID>2
    At this point, all provisioning should step.
11. Run the MIGUNLOAD(1&2) maintenance reports to copy static data from the source application database to flat files by entering the following from the source application administration screen page 2:
    :RUN MIGUNLOAD1
    :RUN MIGUNLOAD2
    Check the output of the MIGUNLOAD1/MIGUNLOAD2 maintenance reports to see if any errors were encountered.
12. Enter the following command to copy the required migration flat data files from the source application user code/pack to the destination user code/pack:
    COPY (<source application usercode>)MIG/=as (<destination usercode>) MIG/=FROM <source application pack> (PACK) TO <destination pack> (PACK)
13. Enter the following command to remove the migration data files from the source application:
    REMOVE (<source application usercode>) MIG/= FROM <source application pack> (PACK)
14. Run the MIGLD12A and MIGLD12B maintenance program to load the static data into the destination database. Enter the following from the destination administration screen page 2:

:RUN MIGLD12A

You will be prompted to respond to 3 questions interactively, answer then via the ODT AX command (<MIGLD12A mix number>AX):
1. "Migrating from UVMS 10.1, 11, 12.1, or 12.2?
2. "What is the NAP DB number of this application?"
3. "What is the starting partition number?"

:RUN MIGLD12B

You will be prompted to respond to 1 questions interactively.
"Migrating from UVMS 10.1, 11, 12.1, or 12.2?"

15. Bounce the destination application to load static data into memory.
16. NAP routing remains the same.

Migration Procedure:

17. Sign on to the destination application and access the Migration Session Parameters (MIGSE) screen to create one or more migration sessions. See the "Procedure to Create a Migration Session" under the "Migration Screens" heading for detailed information on performing this step.
18. Access the Migration Administration Control (MICTL) screen.
    Enter X in the Migration Initlarion & Control field.
    Enter X in the Select field for the session that you want to migrate.
    Transmit. The system displays the MIGCT screen prefilled with the information for the selected session.
19. Enter P in the Action field and transmit the screen to set migration flag in SYSSU at both source and destination application.
20. Start the migration by returning to the Migration Session Initiation and Control (MIGCT) screen, entering S in the Action field and pressing transmit for each migration session to be started. This initiates WFL/UVMS/MIGRATION to start the migration programs.
    While the migration is in progress, you can inquire on the number of mailboxes that have been migrated, terminate the current migration session, or restart a terminated session. When the migration programs are finished, two report files are written to disk under the destination user code/pack.
    UVMS12/summary/<session number>/<date>/<time> contains a summary of the mailboxes that were moved.
    UVMS12/EXCEPTIONS/<session number>/<date>/<time> contains a listing of exception error messages.
    Review the contents of the UVMS12/SUMMARY/<session number>/<date>/<time> disk file for the statistics regarding the mailboxes just moved. These values may not be correct if the system was Halt Loaded during the job or if the job was restarted for any reason.
    Review the contents of the UVMS12/EXCEPTIONS/<session number>/<date>/<time> disk file for any exception error messages. Verify that no additional errors must be corrected.
21. When all migration programs are complete, reset the SYSSU migration flag at both source and destination application by entering an "A" in the Action field of the MIGCT screen and press transmit.

Post-Migration Procedure:

22. If this is a complete migration (all mailboxes have been moved) and if Auto Attendants are used, load and unload the static table for auto attendants.
    From the source application admin screen
    :RUN MIGUNLOAD3 copy the flat data files (MIG/AAPRM/DATA, MIG/AAUSR/DATA, MIG/NODES/DATA) to the UVMS12.2 usercode/pack.
    From the destination admin screen
    :RUN MIGLD12C
23. Clean up the source application
    For partial migration:
        Both applications remain on the host, all calls are routed to the source application and then transferred to the destination application, if the mailbox has been migrated. No previsioning should occur on the source application.
    For full migration:
        Before deleting the source application, the user should make sure all of the mailboxes has been migrated. If there are still mailboxes to be migrated, they should be moved before deleting the source application.
            Modify the routing rule in NAP to send all incoming calls to the destination application. Run AGEDELREP on the source application to clean up the database and voice file. Agedelrep should mark any event records as deletable and put then in the PRGMS dataset. The deletion dialog will then delete all of these voices. MSGRECON can also run in case orphans remain.
            Delete the source application by removing the data files, or run MBSCLEANUP report from source application :RUN MBXCLEANUP from page 2) to delete all mailboxes which have been migrated.
            Back up the destination system.
            If your system does not use networking, the migration is completed. If not and networking is wanted, refer to the Planning and Implementation Guide for installing Networking. If networking is used, force Addressing Service distribution is recommended at this time.
            Delete the EVELG records created during migration by initiating the EVELGDEL maintenance program. Run the report from the destination administration screen page 2 via :RUN EVELGDEL.

Note: if the migration is from a UVMS 12.2 to another UVMS 12.2 stee 6 should be skipped.

Appendix B. Migration Steps

The UVMS 12.2 application software and SPIN application (voice) must be installed prior to performing the migration. The NAPTOOL Installation Manager is used to install the new application from the release tape. These steps are described in the Planning and Implementation Guide.

Pre-Migration Process:

1. Install the UVMS 12.2 application
    Configure the UVMS 12.2 application in NAP
    Run NAPTOOL installation manager to install the UVMS 12.2 application Note:
    1. a new database number needs to be set for the UVMS 12.2 application
    2. the 12.2 application user code needs to be different from the UVMS 11.1

2. Make sure the UVMS 10 LINC maintenance reports MSGRECON, AGEDELREP, SYSPMINFO, VERFINFO, MSGANALYE, MIGUNLOAD, COSOVRLAP, and FIXCOSOVR exist in UVMS 10 application and have been generated.
3. Make sure the UVMS 12.2 LINC reports EVELGDEL, MIGLD12A, and MIGLD12B maintenance programs exist in UVMS 12.2 and have been generated.
4. Compile the Migration COBOL programs
   Sign on to CANDE with destination usercode
   Modify the migration customer parameters file:
      GET WFL/UVMS/MIG/CUSTPARAM
      Update the Customer parameter file with customer-specific information
      Save the Customer parameter file.
   Compile the migration COBOL programs
      Make sure the COBOL migration programs exist:
         SYMBOL/MIGRATION/SET/10
         SYMBOL/MIGRATION/RESET/10
         SYMBOL/MIGRATION/SRC/10
         SYMBOL/MIGRATION/DEST
      START WFL/UVMS/MIGRATION/COMPILE
         After the WFL is completed, the following object files should be created:
            OBJECT/MICRATION/SET/10
            OBJECT/MIGRATION/RESET/ 10
            OBJECT/MIGRATION/SRC/SRC/10
            OBJECT/MIGRATION/DEST
5. Reassign COS Id to UVMS 10 mailboxes if the COS is shared by different type (residential, small business, and large business) of mailboxes.
   Initiate COSOVRLAP report (from UVMS 10 Report Initiation screen) to find all COSs that are shared by mailboxes with different mailbox type.
   Based on the output file from COSOVRLAP report (MBXTYP/COS/OVERLAP), create new COSs with identical settings for use by different type of mailboxes
   Sign on the CANDE with the UVMS 11user code, modify MBXTYP/COS/OVERLAP to assign the new COS to different mailbox type.
   Initiate FIXCOSOVR report (from UVMS 10 Report Initiation screen) to propagate the new COS Ids to UVMS 11 mailboxes based on the COS assignment in MBXTYP/COS/OVERLAP file.
6. Run the AGEDELREP, DELREP, and MSGRECON maintenance programs on the UVMS 10 database to clean up the database. You can also run MSGANALZE to get an estimate of how much additional voice storage will be needed. This can be run later also to get a different estimate at a different time of day. After the clean up maintenance programs are completed, access the OPERs screen of the UVMS 10 application to turn the 3 maintenance programs off so they will not be initiated again until after migration is completed.
7. Ensure that your terminal is ODT capable by entering the following command from the MARC screen for both applications. <LSS mix number> AX ODT <station ID>2
   At thts point all provisioning should stop.
8. Run the SYSPMINFO maintenance program by entering the following from the LINC administration screen page 2 of the UVMS 10 application:
   :RUN SYSPMINFO
   SYSPMINFO prompts you to enter the following information for UVMS 12.2:
      default county code
      should the default country code by a system default
      mailbox length (number of digits)
      number of mailbox prefix (area code) digits
      number of abbreviated addressing digits (must be greater than 3 and less than or equal to the mailbox length minus the number of mailbox prefix digits)
      partition number (If there are multiple applications on a host that will be used for Addressing Services, partition numbers must be unique on a host. Enter a starting partition number and all of the partitions will be renumbered. When migrating another application, enter a starting number that ensures there will be no overlapping of numbers.)
      default data name (used only where a lata name is not already specified)
      the name of the UVMS 12.2 application (for BICSS)
   Running SYSPMINFO creates the MIG/SYSPMINFO and MIG/SYSPARINFO files.
   The MIG/SYSPMINFO file contains one record for each domain.
   You can manually change a value for a specific domain and save the file.
   The layout of the MIG/SYSPMINFO file is:
      Partition (3A)
      Domain (3A)
      Mailbox length (2N)
      Country Codes (4A)
      Area code digits (2N)
      Abbreviated address length digits (2N)
      Lata (4A)
   The MIG/SYSPARINFO file contains one record of default values.
   The layout of the MIG/SYSPARINFO file is:
      Country Codes (4A)
      Transfer to Application (1OA)
      Database Number (7N)
      Partition number (3N)
      UVMS 12.2 System name (10A)
   Note: MIG/SYSPARINFO and MIG/SYSPMINFO will be used by MIGLD12A report at step 13.
9. Run the VERFINFO maintenance program to verify that all mailboxes have a valid mailbox length by entering the following from the UVMS 10 LINC administration screen page 2:
   :RUN VERFINFO
   Check the output of the VERFINFO maintenance program to see if there are mailboxes of a different mailbox length, that must be moved to another domain.
10. Run the MIGUNLOAD maintenance program to copy all static data from the UVMS 10 database to disk by entering the following from the CVMS 10 LINC administration screen page 2:
    :RUN MIGUNLOAD
    Check the output of the MIGUNLOAD maintenance program to see if any errors were encountered.
11. Enter the following command to copy the required migration files from UVMS 10 user code/pack to UVMS 12.2 user code/pack:
    COPY (<UVMS 10 usercode>)MIG/=AS (<UVMS 12.2 usercode>)MIG/ =FRON <UVMS 10 pack> (PACK) TO <UVMS 12.2 pack>(PACK)
12. Enter the following command to remove the migration files from UVMS 10:
    REMOVE (<UVMS 10 usercode>)MIG/= FROM<UVMS 10 pack>(PACK)

13. Run the MIGLD12A and MIGLD12B maintenance program to load the static data into the UVMS 12.2 database. Enter the following from UVMS 12.2 LINC administration screen page 2:
RUN MIGLD12A
You will be prompted to respond to 2 questions interactively.
"Migrating from UVMS 10.1, 11, 12.1, or 12.2?"
"What is the NAP DB number of this application:
When that report finishes,
:RUN MIGLD12B
You will be prompted to respond to 1 question interactively
"Migrating from UVMS 10.1, 11, 12.1, or 12.2?"

Migration Process

1. Modify NAP routing to send all incoming calls to the UVMS 12.2 application.
2. Sign on the UVMS 12.2 application and access the Migration Session Parameters (MIGSE) screen to create one or more migration sessions. See the "Procedure to Create a Migration Session" under the "Migration Screens" heading for detailed information on performing this step.
3. Access the Migration Administration Control (MICTL) screen.
4. Enter X in the Migration Initiation & Control field.
5. Enter X in the Select field for the session that you want to migrate.
6. Transmit. The system displays the MIGCT screen prefilled with the information for the selected session.
7. Enter P in the Action field and press transmit to initiate WFL/UVMS/MIGRATION which turns off polling in the UVMS 10 application. It also disables users from switching to another to another mailbox from the Main Menu and/or transferring to voice mail from call answer.
8. When the WFL has completed, start the migration by returning to the Migration Session Initiation and Control (MIGCT) screen, entering S in the Action field and pressing transmit for each migration session to be started. This also initiates WFL/UVMS/MIGRATION. While the migration Is in progress, you can inquire on the number of mailboxes that have been migrated, terminate the current migration session, or restart a terminated session. When the migration programs are finished, three report files are written to disk.
   UVMS12/SUMMARY/<session number>/<date>/<time> contains a summary of the mailboxes and Event records that were moved.
   UVMS12/MSGCOUNT/<session number>/<date>/<time> contains a listing of the mailboxes that encountered message count problems.
   UVMS12/EXCEPTIONS/<session number>/<date>/<time> contains a listing of exception error messages.
9. Review the contents of the UVMS12/SUMMARY/<session number./<date>/<time> disk file for the statistics regarding the number of mailboxes and Event records moved. These values may not be correct if the system was Halt Loaded during the job or if the job was restarted for any reason.
10. Review the contents of the UVMS12/MSGCOUNT/<session number>/<date>/<time> disk file for information on the mailboxes that encountered message count problems during migration. To correct message count problems, run the MESSAGECHK maintenance program in fix mode for the mauiboxes in UVMS 12.
11. Review the contents of the UVMS12/EXCEPTIONS/<session number>/<date>/<time> disk file for any exception error messages. Verify that no additional errors must be corrected.
12. When all migration programs are complete, enable the callflows by entering a in the Action field of the MIGCT screen and press transmit. This resets polling activity and will allow AGEDELREP and MSGRECON to run.
13. Sometime prior to doing anymore migrations, run the EVELGDEL report from UVMS 12.2 administration screen page 2. This report is used to clean up the EVELG records created during the migration.
   :RUN EVELGDEL Post-Migration Process:

In order to allow these programs to run the user must do the following steps. This step must only be done once. So if migration is run over several days, this step does not need to be repeated.

1. From the UVMS 12.2 Administration Logon screen, enter OPER in both the Usercode and Password fields. The system displays the Operator's Menu.
2. Select WFL Bath Control by entering the corresponding option number in the Enter Your Selection field. The system displays the WFL Bath Control (OPER2) screen. See "Initiate Maintenance WFLs" in the UVMS Administration and Operations Guide for detailed information on this screen.
3. Reset the values displayed in the Start Time and Interval fields for each of the workflows that are displayed, so as to enable each workflow to start a the proper time and at the proper day interval. To change a value in one or more of these fields, move your cursor to the field and overtype the entry with the new value. Then move the cursor to the Transmitting field (bottom right of the screen) and press transmit. Enter X in the Go To field and Transmit. The system logs you off UVMS 12.2 and displays the MARC screen.
4. Run AGEDELREP on the UVMS 10.1 application to clean up the database and voice file. AGEDELREP should mark any even records as deletable and put them in the PRGMS dataset. The deletion dialog will then delete all of these voices. MSGRECON can also run in case orphans remain. However, in the UVMS10. environment this only includes messages since the last NAP bounce. This means that there could be some orphans that remain in the voice file.
   Before deleting the UVMS 10 application, the user should make sure all of the mailboxes have been migrated. To check, run MIGCHECK from page 2 of UVMS 12.2 administration screen.
   :RUN MIGCHECK
   If there are still mailboxes to be migrated, they should be moved before deleting the old application.
5. Delete the UVMS 10 application by removing the data files.
6. Back up the new system.
7. If your system does not use networking, the migration is completed. If not refer to the Planning and Implementation Guide for installing Networking.

We claim:

1. A method for changing or migrating a voice messaging system including an application and a plurality of user mailboxes, comprising the steps of:

(A) creating a new version of a mailbox for at least one user while keeping said new version of said mailbox in a same location as an old version of said mailbox, wherein said new version of said mailbox comprises a software upgrade; and (B) using said new version of said mailbox for a period of time before removing said old version of said mailbox;

wherein the change or migration is effected such that there is substantially no system interruption.

2. A method as recited in claim 1, wherein said changes include making a software upgrade; moving a logical or physical device from a first location to a second location; moving said logical or physical device from a first computer system to a second computer system; and making a change from a first version of said application to a second version.

3. A method as recited in claim 2, wherein the migration is a complete migration in which all devices are migrated.

4. A method as recited in claim 2, wherein said migration is a partial migration in which only selected devices are migrated.

5. A method as recited in claim 2, wherein, once the change or migration begins, any new inputs or class to the device are routed first to the second version of said application and, if the second version of said application is not ready to receive the input, then to the first version of said application.

6. A method as recited in claim 2, wherein, once the change or migration begins, any new inputs or calls to a device are routed first to the first version of said application, and, if the first version of said application is not yet ready to receive the input, then to the second version of said application.

7. A method as recited in claim 2, wherein the migration comprises three phases, including a pre-migration phase, an on-line migration phase, and a post-migration phase.

8. A method as recited in claim 7, wherein said pre-migration phase comprises:

(1) system flat-file updating;

(2) data verification;

(3) dumping selected system and file variables;

(4) loading the second version of said application; and, (5) loading selected data sets.

9. A method as recited in claim 7, wherein said on-line migration phase comprises:

(1) selecting a scope of migration;

(2) disabling callflows and polling;

(3) initiating a multiple migration session;

(4) transferring selected devices or mailboxes from the first application to the second application;

(5) updating existing files; and (6) finding and evaluating errors.

10. A method as recited in claim 7, wherein, in said post-migration phase, the first version of said application is deleted.

11. A method for changing or migrating a messaging system including an application and a plurality of user mailboxes, comprising the steps of:

(A) creating a new version of said messaging system while keeping said new version of said messaging system in a same location as an old version of said messaging system, wherein said new version of said messaging system comprises a software upgrade; and (B) using said new version of said messaging system for a period of time before removing said old version of said messaging system;

wherein the change or migration is effected such that there is substantially no system interruption.

12. The method of claim 11, wherein said new version of said messaging system comprises a software upgrade to said application.

13. The method of claim 11, wherein said new version of said messaging system comprises a software upgrade to one or more of said plurality of mailboxes.

14. The method of claim 11, wherein said method is complete when all of said plurality of user mailboxes are changed or migrated.

15. The method of claim 11, wherein said method is partially complete when only selected mailboxes of said plurality of user mailboxes are changed or migrated.

16. The method of claim 11, wherein, once said changing or migrating begins, any new inputs or calls to said messaging system are routed first to said new version of said messaging system, and if said new version of said messaging system is not yet ready to receive said input, then to said old version of said messaging system.

17. The method of claim 11, wherein, once said change or migration begins, any new inputs or calls to said device are routed first to said old version of said messaging system, and if said old version of said messaging system is not yet ready to receive said input, then to said new version of said messaging system.

18. The method of claim 11, wherein said changing or migrating comprises three phases, including a pre-migration phase, an on-line migration phase, and a post-migration phase.

19. The method of claim 18, wherein said pre-migration phase comprises:

(1). updating a system flat-file;

(2). verifying data;

(3). dumping selected system and file varaiables;

(4). loading said new version of said messaging system; and, (5). loading selected data sets.

20. The method of claim 18, wherein said on-line migration phase comprises:

(1). selecting a scope of migration;

(2). disabling callflows and polling;

(3). initiating a multiple migration session;

(4). transferring selected mailboxes from said new version of said messaging system to said old version of said messaging system;

(5). updating existing files; and, (6). finding and evaluating errors.

21. The method of claim 18, wherein, in said post-migration phase, said old version of said messaging system is deleted.

* * * * *